US008081630B2

(12) United States Patent
O'Malley et al.

(10) Patent No.: US 8,081,630 B2
(45) Date of Patent: Dec. 20, 2011

(54) PACKET DIVERSION IN SWITCHING FABRICS AND MULTIPLE FORWARDING INSTRUCTIONS FOR PACKETS

(75) Inventors: Edele O'Malley, Lucan (IE); Eugene O'Neill, Dublin (IE); Kam Choi, Tring (GB); Daniel Martin O'Keeffe, Dublin (IE)

(73) Assignee: Hewlett-Packard Company, Palo Alto, CA (US)

( * ) Notice: Subject to any disclaimer, the term of this patent is extended or adjusted under 35 U.S.C. 154(b) by 902 days.

(21) Appl. No.: 11/121,192

(22) Filed: May 3, 2005

(65) Prior Publication Data
US 2006/0203816 A1 Sep. 14, 2006

(30) Foreign Application Priority Data

Mar. 11, 2005 (GB) .................................. 0505050.5

(51) Int. Cl.
*H04L 12/56* (2006.01)
(52) U.S. Cl. ......................... 370/392; 370/400; 370/429
(58) Field of Classification Search .................. 370/352, 370/356, 389, 392, 400, 401, 428, 429
See application file for complete search history.

(56) References Cited

U.S. PATENT DOCUMENTS

| 5,724,358 | A * | 3/1998 | Headrick et al. .............. 370/418 |
| 5,996,021 | A * | 11/1999 | Civanlar et al. .............. 709/238 |
| 6,104,696 | A * | 8/2000 | Kadambi et al. .............. 370/218 |
| 6,301,257 | B1 * | 10/2001 | Johnson et al. .............. 370/406 |
| 6,473,434 | B1 * | 10/2002 | Araya et al. .............. 370/412 |
| 6,680,945 | B1 * | 1/2004 | Merchant et al. .............. 370/395.53 |
| 6,721,317 | B2 * | 4/2004 | Chong, Jr. .............. 370/389 |
| 2003/0076826 | A1 * | 4/2003 | Blasiak et al. .............. 370/389 |
| 2004/0066799 | A1 * | 4/2004 | Li et al. .............. 370/474 |
| 2005/0018693 | A1 * | 1/2005 | Dull .............. 370/396 |
| 2006/0077975 | A1 * | 4/2006 | Huang et al. .............. 370/389 |

FOREIGN PATENT DOCUMENTS

GB    2 395 618 A    5/2004

OTHER PUBLICATIONS

Search Report for Application No. GB 0505050.5.

* cited by examiner

*Primary Examiner* — Ricky Ngo
*Assistant Examiner* — Wei-Po Kao

(57) ABSTRACT

A cascade system of network units includes forwarding units which have external ports, a communication fabric connecting the units and at least one processing unit which needs no forwarding database. The processing unit may perform a security operation such as intrusion prevention or encryption. Each forwarding unit on receipt of a packet performs a lookup to determine an egress port, to determine whether the packet must be diverted to a processing unit, to provide the packet with a first forwarding instruction identifying the egress port uniquely within the system and a second forwarding instruction identifying a diversion port by which the packet can reach the processing unit and to set an order field which determines which of the forwarding instructions shall be performed first. The processing unit is operative on receipt of the packet by way of the diversion port to change the order field to specify that the packet should now be sent to the egress port.

17 Claims, 7 Drawing Sheets

US 8,081,630 B2

PACKET DIVERSION IN SWITCHING FABRICS AND MULTIPLE FORWARDING INSTRUCTIONS FOR PACKETS

FIELD OF THE INVENTION

This invention relates to packet-switched communication networks and particularly to the provision of ancillary processing, particularly security operations such as intrusion prevention, encryption or decryption, in such networks. More particularly the invention relates to the incorporation of such ancillary processing operations in a switching fabric that comprises or connects a plurality of network units which each have a multiplicity of external ports, that is to say ports by which packets may enter or leave the fabric.

BACKGROUND TO THE INVENTION

It is now common practice in packet-switched communication networks to provide 'switching fabrics' which interconnect a multiplicity of network units such as switches or routers to constitute a system that can be managed as if it were a single unit. In early forms of such switching fabrics, units were 'stacked' each with a connection to the next so as to form a daisy chain of units. The connection between the units was termed a 'cascade connection'. If a packet were received at an external port of one of the units, that unit would perform an address look-up so as to determine whether the packet was destined for a port on the same unit or from a port on another unit. In the latter case, the packet would be directed to the cascade via a 'cascade port' which is intended to mean a port connected only internally of the system, that is to say not a port by which a packet can egress the system of interconnected units. On arrival at another or the next unit, a look-up would be performed until the correct egress port was found. A disadvantage with early forms of cascades was the maintenance of 'synchronised' look-up databases and/or the necessity to perform an address look-up in each unit until an appropriate egress port was found.

Prior application Ser. No. 10/337,299 for O'Neill et al, published as US-2004-0095928-A1 having inventors common to the present application and commonly assigned herewith describes an architecture which is not confined to being a daisy chain but may be a general mesh of network units. Here again, when a unit receives a packet, it performs a look-up to determine whether the packet can be forwarded from a port on the same unit or will have to be forwarded via a cascade port through at least one further unit until it reaches an egress or destination port.

In both O'Neill et al, supra, and Donoghue et al, Ser. No. 10/067,738, filed Feb. 8, 2002, having inventors common to the present application and commonly assigned herewith, a packet while it is within a cascade system has a temporary 'header' which comprises a destination port field, a source port field and a validity field which indicates that the destination port field is valid. The destination port field can identify an egress port for a unicast packet if the validity field is set appropriately. If the validity field is not set, it may signify either that a lookup has not been performed or that the packet is a multicast or broadcast packet. However, the validity field does not prescribe any precedence of forwarding instructions. The source port field indicates, as the name implies, the ingress port for the packet.

Security operations are becoming desirable features in network systems. One form of security operation is normally termed 'IDS' (intrusion detector system) or 'IPS' (intrusion prevention system) and a typical system employing IDS or IPS includes a DFA (deterministic finite-state automaton) which is used to detect any of a (usually) large number of digital signatures which have been determined to be undesirable. Typically a DFA is capable of detecting digital signatures comprising a string of hundreds of characters. A DFA typically comprises a character detector and memory which stores digital signatures as respective sequences of states. One example is given in prior copending U.S. patent application Ser. No. 11/064,257 for Furlong et al, entitled 'Pattern matching using deterministic finite automata and organization of such automata', filed Feb. 22, 2005 and commonly assigned herewith.

Other security operations which are now desirable are those of encryption and decryption. One example of the use of encryption is in the operation of virtual private networks which employ, for example, a tunnelling protocol encapsulated within UDP datagrams that are themselves encrypted within an IP (internet protocol) packet. An example is described in prior copending U.S. patent application for Loughran et al, entitled 'Deciphering encapsulated and enciphered UDP datagrams' filed Feb. 28, 2005 and commonly assigned herewith.

It should be understood that not all packets that are received by a network unit such as a switch or router require encryption or decryption. Moreover intrusion detection may be selected only for certain classes of packets, such as UDP packets or for packets having a particular combination of network addresses and/or 'application port' numbers. Whether a packet is encrypted and therefore requires to be processed by a decryption block can be determined by reference to a selection of fields in the header of a packet. For this purpose a 'rules engine' may be used, for example as described in prior U.S. patent application for O'Neill et al, Ser. No. 10/338,170, published as US-2004-0095936-A1 and commonly assigned herewith.

In order to integrate a security operation such as intrusion prevention into a switching fabric, changes have to be made to the ordinary forwarding model that is currently in use. For example, the forwarding device that possesses the ingress port may examine the packet's headers to determine whether any given packet should be diverted for analysis against a set of known signatures, for example using a DFA or otherwise. If the packet header determines that no analysis is required, the packet should be forwarded normally. If analysis is required, the packet should first be diverted to the IPS system instead of being forwarded to the egress port. If the intrusion prevention device is incorporated within a forwarder, e.g. a switch or router having a lookup database and a forwarding engine, the IPS ASIC has to perform a normal link layer (layer 2) or network layer (layer 3) forwarding operation. This has to take into account the ingress port on which the packet was received. This means that with reference to a particularly ingress port the forwarding can take place in two locations, either the normal ingress forwarder or the IPS device. This results in a system which is inherently more complicated as well as requiring a forwarding database and appropriate functionality in the IPS device.

Similar considerations apply if the security operation is encryption or decryption. More generally, if in a switching fabric or cascade system of the general kind described in the foregoing one provides an ancillary processing function which may or may not be required for any given packet, there is added complexity, additional latency and inconvenience associated with the provision of the forwarding function with the ancillary processing unit.

SUMMARY OF THE INVENTION

The basis of the present invention is the application to a packet within such a system as has been described of two forwarding instructions and a field or flag which indicates which of those instructions has priority over the other, i.e. shall be executed first. In a preferred form of the invention the instructions are constituted by a temporary header which contains a first field that uniquely identifies an egress port of the system and a second field which indicates a diversion port, which may be a port internal to the system. Such a port may be and preferably is a port which is on or communicates with the processing device which may or may not need to be employed in respect of that particular packet.

Accordingly, the source unit may now make a determination whether an ingressing packet needs ancillary processing and in particular processing by a security block either for the purpose of intrusion detection or encryption or decryption or otherwise. If such examination determines that the packet may be forwarded normally, the egress port will be inserted as the first field and the 'order' flag can be set to indicate that the egress port has priority; this implies that the packet will not be sent to the processing unit at all. The second field in this example is immaterial and may, but need not be, set to a null value. On the other hand, if the initial examination of the packet determines that the packet should be sent to the ancillary processing unit, then the source unit can still perform a complete look-up and insert the egress port in the first field. It may set in the second field an identification of a port (herein called 'diversion port') that will enable the packet to reach the ancillary processor. Depending on how the system is organized, this may be an identification of a port of the ancillary processor but may be a port of a unit to which the ancillary processor is directly connected. In addition, the source unit will set the order flag so that the diversion port has priority over the destination port. Then the switching fabric can recognise the order flag and will divert the packet to the processing unit.

The important advantage of this scheme is that the look-up to determine the ultimate egress port (if any) has already been made and therefore there is no need for the intrusion detection unit or other ancillary processing unit which is incorporated within the system to perform any further look-up. When that processing unit has performed its function and on the assumption that the packet should then be forwarded to the required destination, the ancillary processing unit need only change the order flag to give the already determined egress port forwarding instruction priority and the switching fabric will recognise the header as a command to send the packet to the previously determined egress port.

Further features and advantages of the present invention will become apparent from the following detailed description which refers to the accompanying drawings.

DETAILED DESCRIPTION

Figure 1:
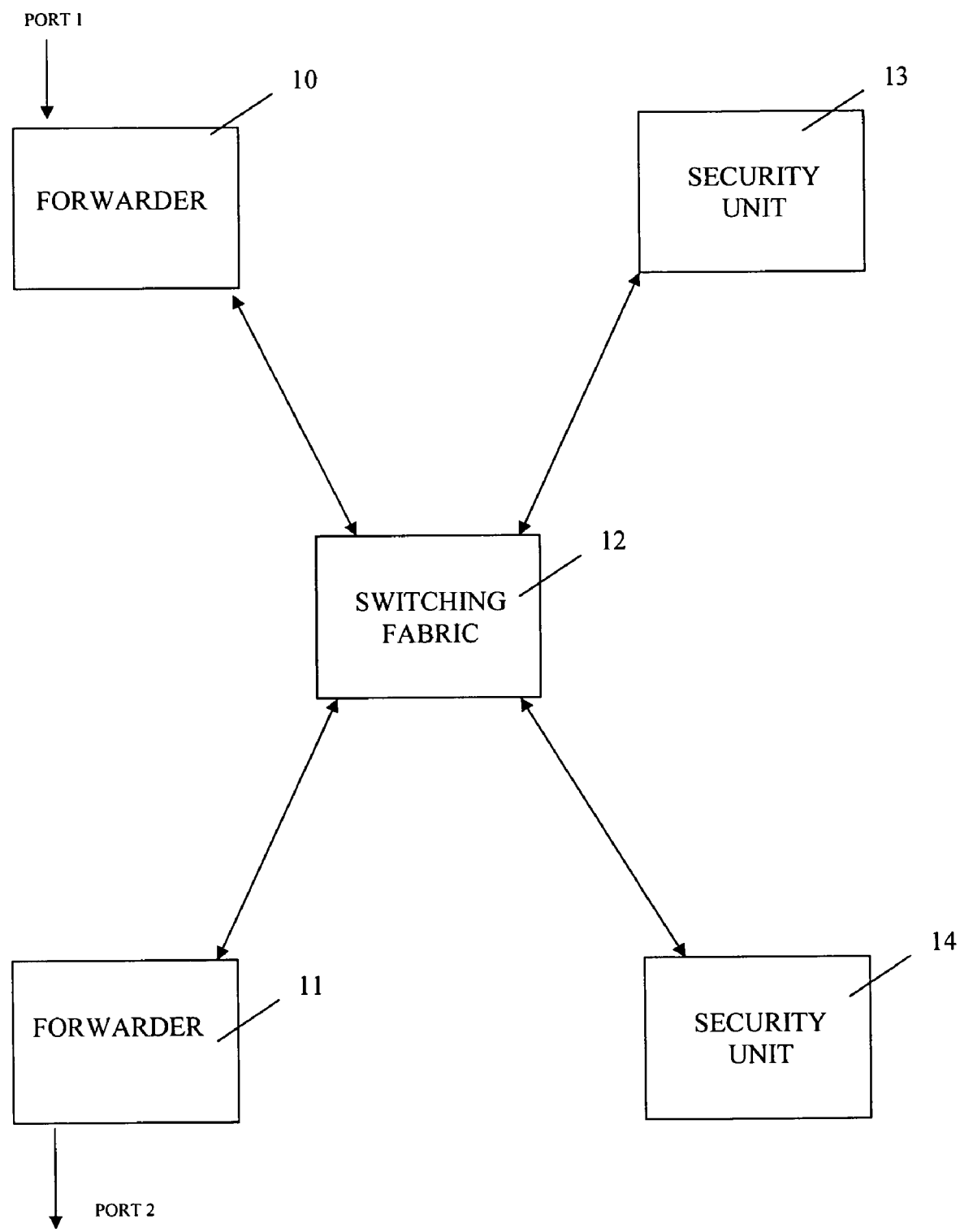
FIG. 1 is a general schematic diagram of a system in accordance with the invention.

FIG. 1 of the drawings illustrates functionally a system according to the invention. The system includes two 'forwarders' 10 and 11 which represent the look-up and forwarding functions of, in practice, two network units such as switches or routers. Each of these forwarders includes a lookup database and a forwarding engine as will be described with reference to FIG. 2. Also shown in FIG. 1 is a 'switching fabric' 12, which represents the interconnection between the various units in the system. As is indicated previously, the switching fabric may be represented by the switching functions and interconnections of units as described for example in the aforementioned GB patents. In other words, the switching fabric and the forwarders may be a set of 'stacked' network units connected either in a daisy chain cascade or in a mesh cascade or otherwise. In essence, such a system allows the management of the network units as a single entity which may, as far as the external communication network is concerned, represent a single node. For example, where the forwarders are switches each with 32 external ports, the forwarders 10 and 11 and the switching fabric 12 can act as a single switch with 64 ports.

Included in FIG. 1 are two 'security' units 13 and 14. These are shown functionally as connected to the switching fabric 12. In practice, each may be connected to a respective port of one or other of the network units represented by the forwarder 10 and the forwarder 11.

Figure 3:
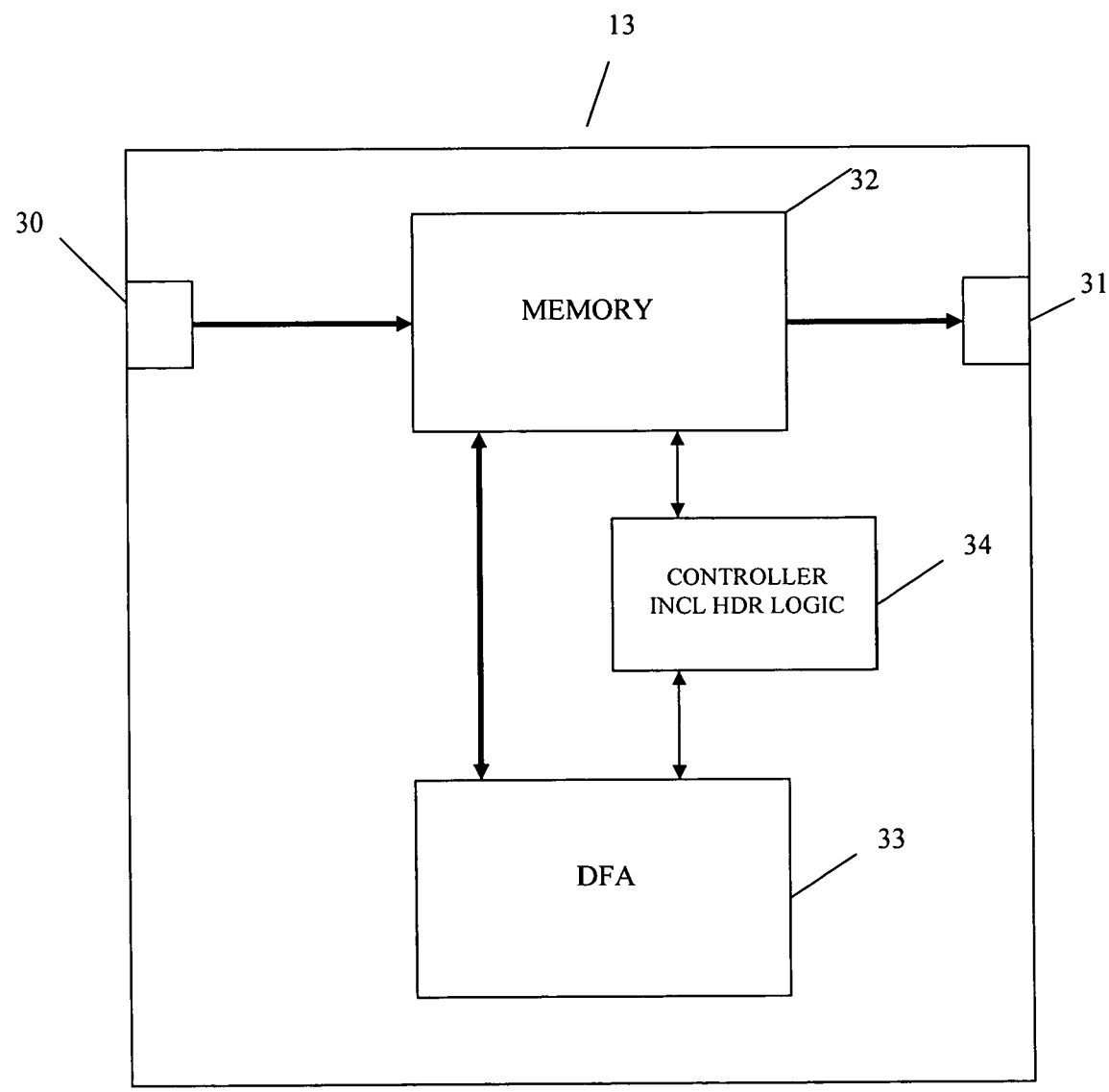
FIG. 3 is an illustration of an intrusion detection unit.
Figure 4:
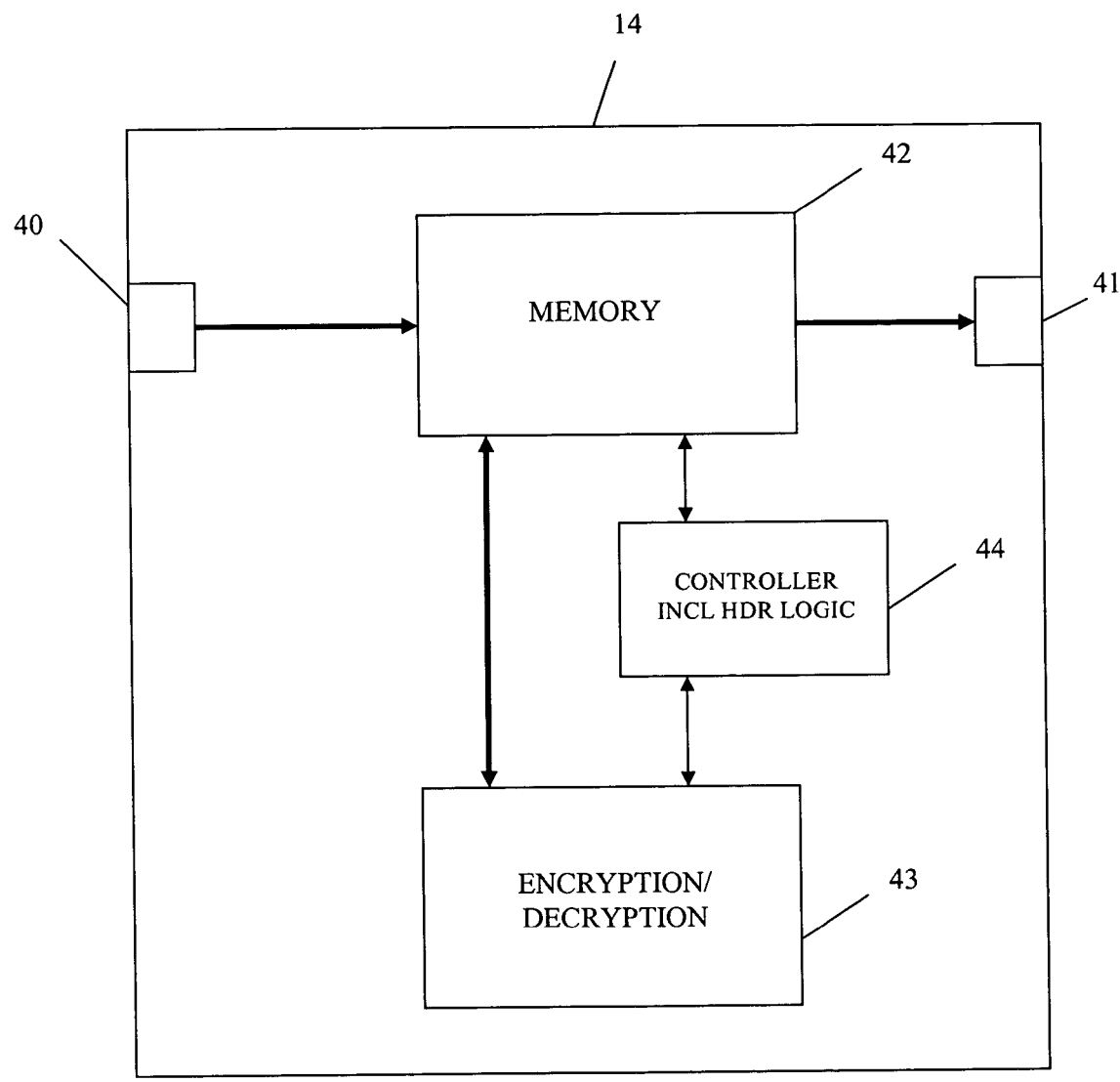
FIG. 4 is a schematic illustration of an encryption and decryption unit.

Examples of the units 13 and 14 are described in FIGS. 3 and 4 respectively. It need only be stated at the present stage that each may be, for example, a unit which is organised to detect undesirable or threatening digital signatures of an incoming packet or may be an encryption/decryption unit or even some other form of ancillary processing unit.

In order to illustrate one of the difficulties which is circumvented by the present invention, let it be supposed that each of the units 13 and 14 in addition to the 'security' function that it performs, is also required to perform a look-up and to determine thereby the forwarding data of a packet that is received. Accordingly, if a packet is received port 1 (for example) by forwarder 10 and is 'classified' by for example examination of header data, such that it should be sent to unit 13 for signature analysis, the forwarder 10 in accordance with the classification data will produce a forwarding instruction directing the packet to unit 13. Unit 13 will analyse the packet. On the assumption that the examination does not detect any undesirable digital signature, unit 13 would need then to perform a fresh look-up to derive forwarding data for sending the packet out through an egress port, such as port 2 of forwarder 11. This a multi-stage lookup process. The first stage is the look-up in forwarder 10. Such a look-up, performed on for example the destination IP address in the packet, would normally yield forwarding data that would enable the packet to egress from the system from forwarder 11, port 2. However, that look-up is overruled by the exceptional classification processing performed on the packet in forwarder 1 and the packet is forwarded to unit 13. On the assumption that the examination of the packet will allow the packet to be forwarded, unit 13 must perform a fresh look-up on the destination network address and direct the packet so that it ultimately egresses from port 2 on forwarder 11.

Such a scheme requires not only two forwarding look-ups but requires continual updating of a forward database in unit 13 so that entries in such a database match entries in the database of forwarder 10. Such a process is commonly called 'synchronisation'.

Thus the connection, otherwise desirable, of a security unit in a multi-unit switching fabric not only produces unnecessary latency, owing to the multiple look-ups, but also considerable operational overhead by virtue of the necessity of maintaining a forwarding database in the security unit. The disadvantage is increased where, as for example as shown in FIG. 1, there is more than one security unit connected in the switching fabric. Such an additional unit may be required because it is convenient to examine different classes of packet by different security units; alternatively the unit 14 may be an encryption or decryption unit which is required for use on some but not all the packets received by the system. That circumstance is typical where the system shown in FIG. 1 may convey ordinary traffic but also traffic which is conveyed according to tunnelling protocols because the system accommodates traffic of a virtual private network.

Figure 2:
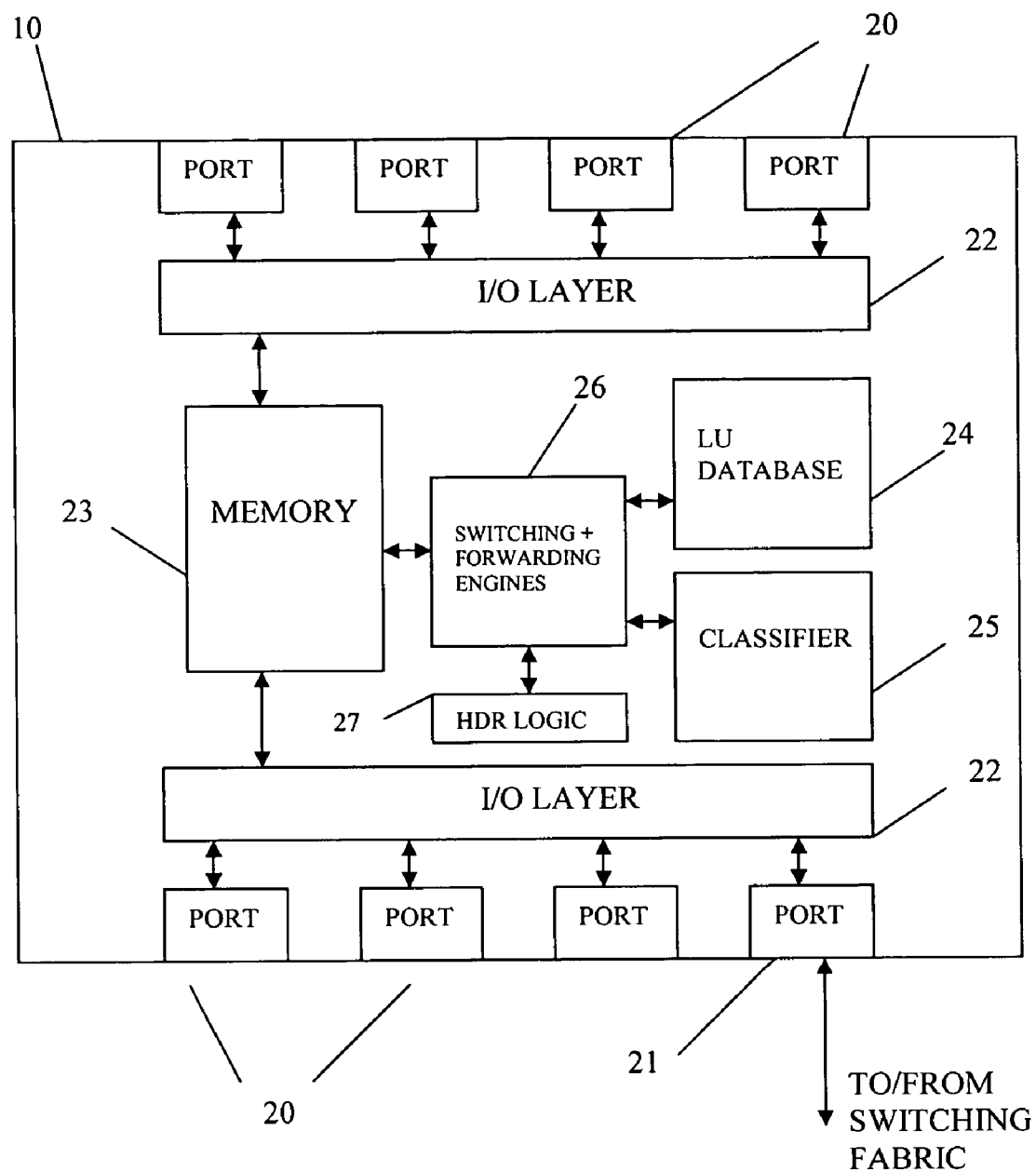
FIG. 2 is a schematic illustration of a forwarding unit constituted by a switch in accordance with the invention.

FIG. 2 of the drawings illustrates schematically a switch unit of the kind which might be used in a system according to the invention. For the most part, a switch unit such as shown in FIG. 2 is of known organisation. Typically the switch 10 has a multiplicity of external ports 20, that is to say port which are intended to receive packets from or send packets to an external system. In the present case, one of these ports, port 21, is connected to the 'switching fabric' that is to say it is an internal port which sends packets to or receives packets from only to a cascade connection or to another unit within the cascade or mesh system.

The unit 10 has a link layer 22 (shown in two parts only for convenience) by means of which packets received from the ports 20 are conveyed to the main memory 23 of the switch while they are examined not only for determining forwarding data but also for the purpose of classification, to see whether they should be sent to a security unit for appropriate processing. The unit 10 includes a look-up database 24. This is organised on known lines, typically having entries which co-relate source and destination addresses against forwarding data. Such a look-up database may be populated with 'static' addresses. Alternatively and more usually it is populated by an examination of the source IP address of an incoming packet and making an entry which associates that source address with the port on which the packet has been received.

The control of the look-up process and the necessary control of the flow of packets in the switch are controlled by switching and forwarding engines 26 which operate according to known principles.

In addition to the ordinary look-up process performed on a packet, each packet is examined with recourse to a classifier 25. Such a classifier is typically organised to perform an examination of a set of data from the header of the packet. The essential purpose of classification is to determine whether the packet requires processing by a special processing engine such as is incorporated in a security unit as will be described with reference to FIG. 3 and FIG. 4.

As will be explained in more detail hereinafter, the switch unit 10 differs from known switch units by the inclusion of header logic 27. This is shown explicitly for the sake of convenience though in practice is included in the programmed routines of the switching and forwarding engines 26. The manner in which the header logic operates will be described with reference to FIGS. 5 to 8.

FIG. 3 of the drawings illustrates schematically an intrusion detection unit such as unit 13. A more detailed description of such a unit may be found in, for example, in Furlong et al, supra. However, the detailed construction and manner of operation of such a security unit is not of any great consequence to the invention except in one respect as discussed below.

The unit shown in FIG. 3 has an ingress port 30 and an exit port 31. These are shown separately for convenience though in practice ports 30 and 31 may be constituted by single duplex port.

In operation of the unit 13, packets received at port 30 are received in memory 32 and examined character by character by a deterministic finite automaton (DFA) 33. The reading of characters in packets from the memory and the control of flow of packets is done by means of a controller 34.

What happens in essence is that the characters are examined in turn to determine whether a state machine constituted by the DFA should progress along a sequence which corresponds to a respective digital signature or return to an initial or null state. Such a process is fully described in the aforementioned GB patent application and need not be repeated here. For present purposes, it is only necessary for the unit to perform a security check on the packet to determine whether the packet should be discarded or permitted to egress the system.

FIG. 4 illustrates for the sake of example the main features of an encryption or decryption unit. Like the unit 13 shown in FIG. 3, unit 14 has a port 40 for receiving a packet sent to it and an exit port 41. Again, ports 40 and 41 may be merged into a single duplex port. Packets received at port 40 are coupled to memory 42 and subjected, by means of an encryption/decryption block 43 under the control of a controller 44 to encryption or decryption as the case may be. One form of encryption system which may be employed in these circumstances is described by Loughran et al, supra.

As thus far described, the units 13 and 14 shown in FIGS. 3 and 4 respectively may operate in any convenient manner to perform a security operation on a received packet, whether that security operation is examination for signatures, encryption, decryption, or other processing operation.

Figure 5:
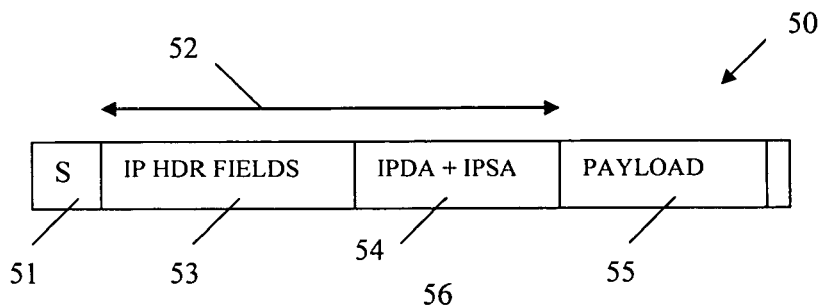
FIG. 5 is an illustration of an IP packet as it enters the system.
Figure 6:
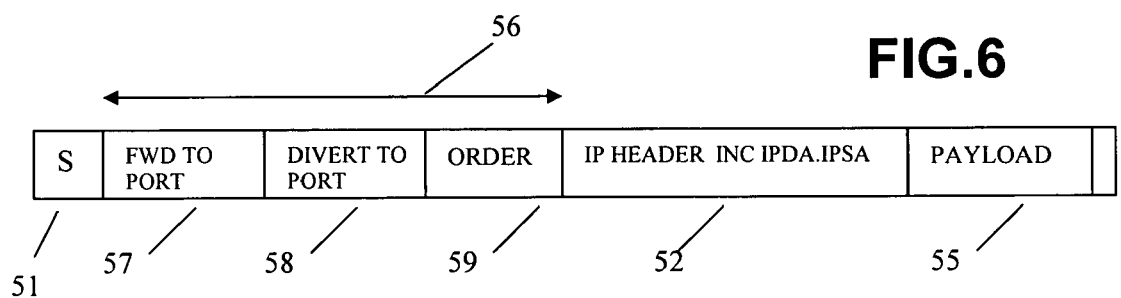
FIG. 6 is an illustration of the IP packet including two forwarding instructions in accordance with the invention.
Figure 7:
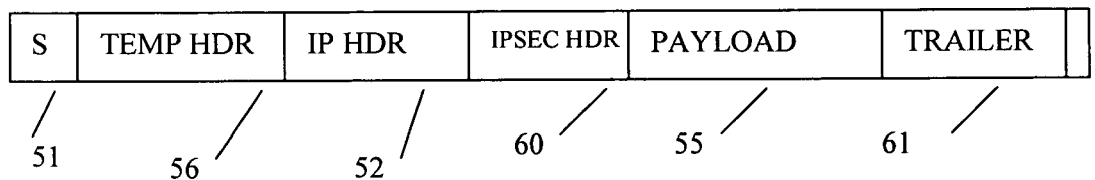
FIG. 7 is an illustration of the IP packet including an encrypted payload.
Figure 8:
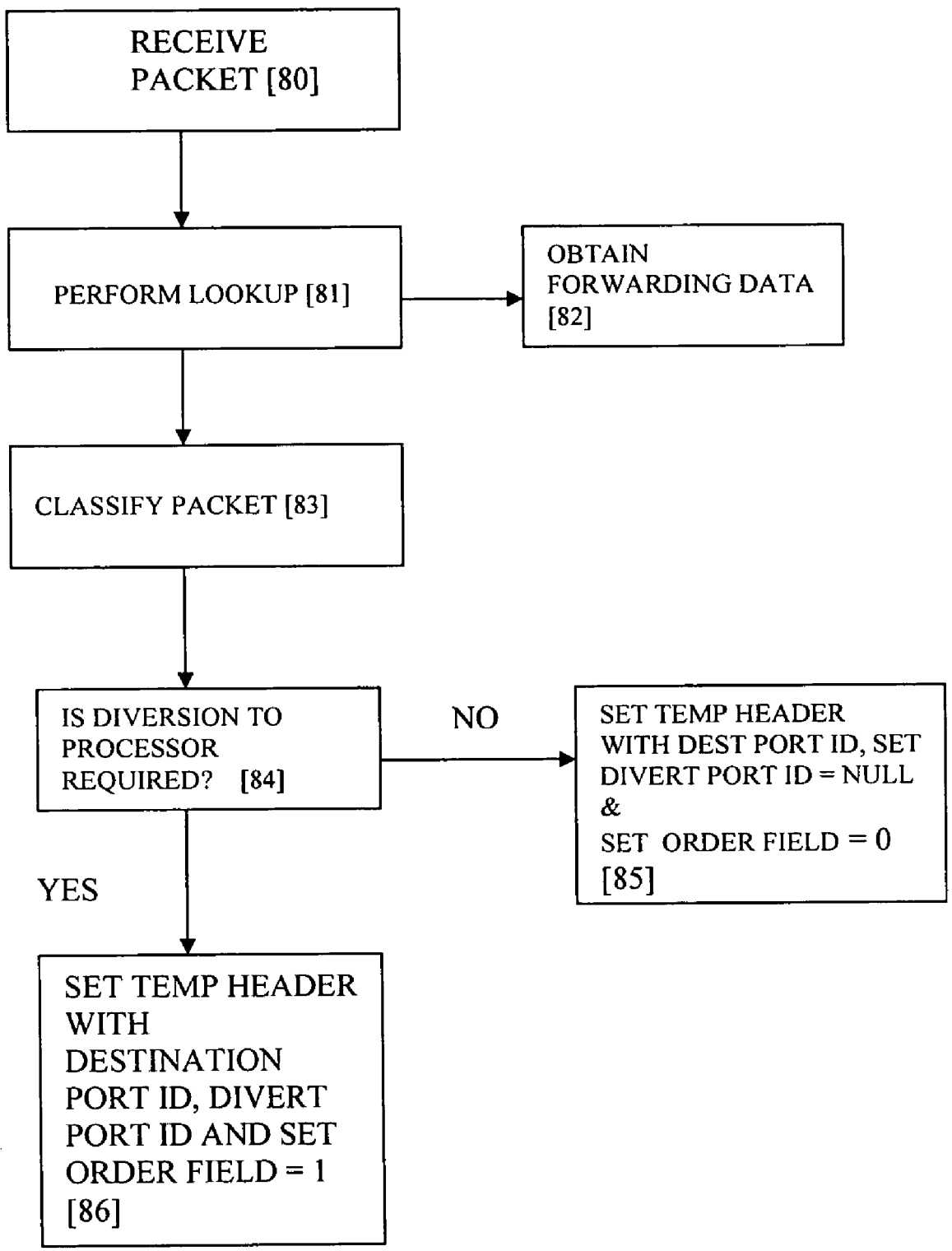
FIG. 8 is a schematic diagram of a lookup and classifying process according to the invention.
Figure 9:
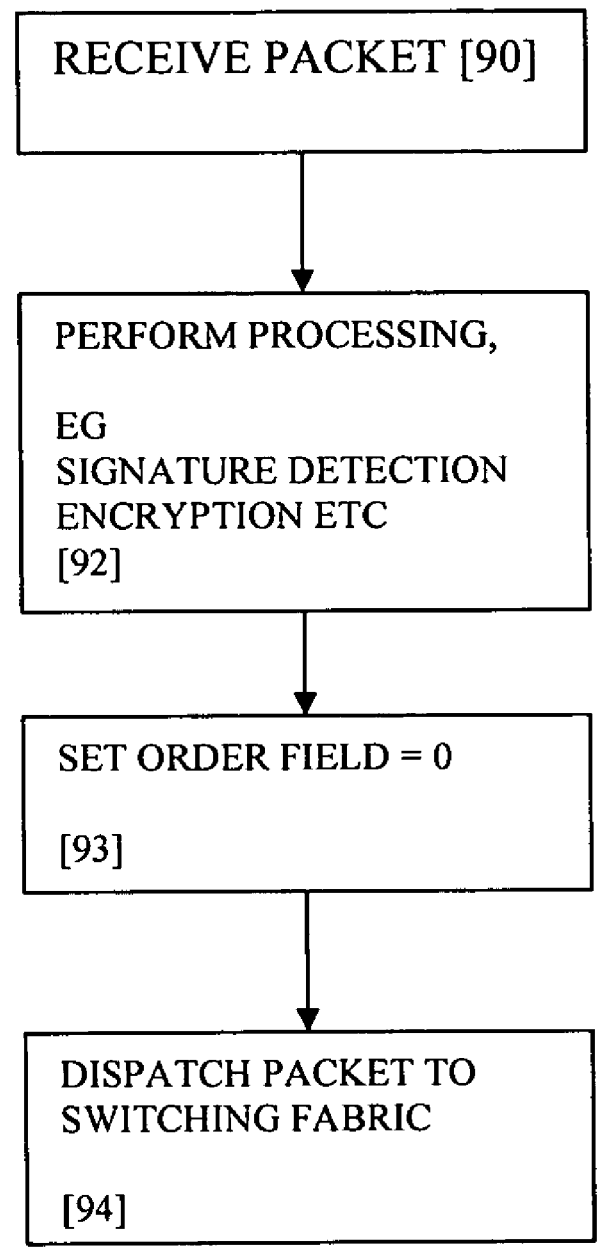
FIG. 9 is a flow diagram of the relevant operation of a processing unit in accordance with the invention.

FIGS. 5 to 7 show the form of packets which are employed in the system and FIGS. 8 and 9 are flow diagrams illustrating the operation of respective logic in a forwarding unit and in the security units 13 or 14.

The basis of the present invention is that the look-up and classification process performed by the source unit, that is to say the unit which receives the packet from the external system, should provide the packet before it is sent by that unit into the switching fabric with two forwarding instructions, one of which is an ordinary forwarding instruction, enabling the packet to reach the egress port and the other of which is a diversion instruction enabling the packet to go to the processing unit (unit 13 or 14 as the case may be). In addition, these forwarding instructions are supplemented by an ordering instruction, determining which of the forwarding instructions should be performed first. It will be understood that the forwarding instructions (unlike implicit forwarding instructions such as link-layer and network addresses) are of 'equal' status, and do not in themselves indicate any order in which they shall be executed.

FIG. 5 illustrates a packet 50 as it is received by the source unit. It is shown in simplified schematic form for the sake of simplicity. After a 'start of frame' (S) 51 the packet has an IP header 52 comprising 'IP HDR FIELDS' (IP header fields) 53 and address data, usually the IPDA (internet protocol destination address) and the IPSA (internet protocol source address). In practice, the IP header is rather more complex, having included in the IP header fields type fields, a check sum, a protocol field and so on in accordance with IP Version 4 or IP Version 6 as the case may be. In any event, the packet is followed by a payload 55 which may be for example TCP header fields followed by message data or an encapsulated UDP datagram or other message data. The nature of the payload is not of consequence to the invention.

FIG. 6 illustrates the packet after it has been subjected to the look-up process and the classification process in the source unit (forwarder 10 in the example shown in FIG. 1). The packet is provided by means of the header logic 27 with a temporary header 56 which includes two forwarding instructions. These are represented by two fields 57 and 58 as described below.

A first of these fields (the chronological order is not important) is a forwarding port identification (FWD TO PORT) 57. This field uniquely identifies the egress port, i.e. the port from which the packet should, if not for some reason discarded, be forwarded out to the external network. For this purpose the field 57 should be large enough to accommodate any practical aggregate number of ports of all the network units within the cascade or mesh system of units. For example the field may be a ten-bit number, which would allow for the unique identification of 1024 different ports.

The second field is a diversion port identification (DIVERT TO PORT) 58. This may identify for example port 30 or port 40. Alternatively if unit 13 were connected directly to a port on unit 10 or unit 11 the field could identify the port in the same manner as the first field identifies the egress port.

The header 56 also comprises an 'order' flag field 59. The order field would be, in one example, a 0 if the forwarding instruction 57 had priority and a 1 if the diversion instruction 58 had priority.

FIG. 8 is a flow diagram of the forwarding operation, the classifying operation and the operation of the header logic in the source unit. The first stage 80 is the reception of the packet. A look-up 81 is performed on the packet to determine the egress port, stage 82. Serially or in parallel relative to the lookup 81, a classifying operation 83 is performed and a decision 84 is made, to determine whether the packet is required for forwarding to an ancillary processor. If the packet is not required to go to the processing engine, the header 56 is compiled in stage 85 using the egress port identification 57 as determined in stage 82, a null value for the diversion port identification and an order field set to zero.

If however the decision stage 84 requires the packet to go to the ancillary processor (such as unit 13) then at stage 86 the header logic provides the packet with a forwarding port instruction as before, a diversion port ID set to a port which will identify the processing engine and an order field set to one.

In the first case, the order field will determine that the egress port instruction will be performed first; thus the packet is sent by way of the switching fabric to the egress port. The value of the 'divert to prt' field 58 is immaterial. It may be set to a null value or other indeterminate value that does not identify any port. In the second case, the diversion port instruction has priority and the packet will be sent first to the selected processing unit, e.g. unit 13 or 14 as the case may be.

The identification of the diversion port need only be sufficient to ensure that the packet, if require to be diverted, reaches the relevant processing engine. If for example the processing engine is coupled to a port on the forwarding units, the diversion instruction need only identify that port.

FIG. 7 shows the packet 50 after it has been handled by an encryption device. It retains the temporary header 56 and the IP header 52 but has been provided with an IP security header 60 and a trailer 61 preceding and succeeding the original payload 55.

FIG. 9 illustrates the operation on the temporary header 56 of the packet that needs to be performed by the header logic in the security unit 13 or 14 as the case may be. Stage 91 is the reception of the packet. Stage 92 is the processing of the packet either for the purpose of checking digital signatures, or for encryption, or for decryption, or otherwise. On the assumption that the packet is allowed to proceed, the unit 13 or 14 merely changes the order field 59 (stage 93) and dispatches the packet (stage 94). It may if desired change the 'divert to port' field 58 to a null value.

Thus there has been described a method and system which allows an ancillary processor to be incorporated within a switching fabric without requiring its own lookup database and lookup engine. However the invention does not preclude the use of an ancillary processor having such features; the header and particularly the order field may be used to enable a bypass of the lookup process in such a unit.

What is claimed is:

1. A method of transmitting packets within a system comprising a plurality of network units connected by a switching fabric, the system including at least one unit that is operable to perform a lookup based on address data in an incoming packet and at least one other unit, the method comprising:
   applying to said incoming packet a temporary header comprising two forwarding instructions to be executed and an order instruction that is separate from the two forwarding instructions and wherein the order instruction indicates which of said forwarding instructions shall be executed first, wherein a first forwarding instruction designates an egress port and a second forwarding instruction designates a diversion port;
   determining whether the packet is to be sent to said at least one other unit through said diversion port; and
   in response to a determination that the packet is to be sent through said diversion port, setting the order instruction to indicate that the packet is to be sent through the diversion port first and to be sent through the egress port following receipt of the packet back from the at least one other unit.

2. A method as in claim 1 wherein the diversion port comprises a port that is not connected to a destination originally identified in the packet.

3. A method as in claim 1 wherein said first forwarding instruction identifies an egress port uniquely within said system.

4. A method as in claim 1 wherein said order instruction specifies said second forwarding instruction as the forwarding instruction that shall first be executed and the method further comprises altering said order instruction to specify that said first forwarding instruction shall be executed first.

5. A method as in claim 1 and further comprising, when said order instruction specifies that said first forwarding instruction shall be executed first, setting said second forwarding instruction to an indeterminate value.

6. A method as in claim 1 further comprising: in response to a determination that the packet is to be sent through the egress port, setting the order instruction to indicate that the packet is to be sent through the egress port.

7. A method as in claim 1 wherein said at least one other unit is to perform processing on said packet prior to returning the packet back to the at least one unit.

8. A method as in claim 7 wherein said at least one other unit is to perform a security operation on said packet.

9. A method as in claim 1 wherein said temporary header includes a first field, a second field and an order field, said first field and said second field each specifying a respective port and said order field specifying to which respective port said packet is to be sent.

10. A method as in claim 9 wherein said first field specifies an egress port and said second field specifies the diversion port.

11. A method as in claim 9 wherein said first field identifies said egress port uniquely within said system.

12. A network unit for use in a system of network units including at least one unit that has a plurality of external ports for packets to enter and egress from the system and including at least another unit, the network unit being operable:
(a) to perform a lookup based on address data in a packet; and
(b) to apply to said packet a temporary header comprising two forwarding instructions to be executed and an order instruction that is separate from the two forwarding instructions and wherein the order instruction indicates which of the forwarding instructions shall be executed first, wherein a first forwarding instruction designates an egress port and a second forwarding instruction designates a diversion port;
(c) to determine whether the packet is to be sent to said at least one other unit through said diversion port; and
(d) in response to a determination that the packet is to be sent through said diversion port, to set the order instruction to indicate that the packet is to be sent through the diversion port first and to be sent through the egress port following receipt of the packet back from the at least one other unit.

13. A network unit as in claim 12 wherein said diversion port comprises a port that is not connected to a destination originally identified in the packet.

14. A network unit as in claim 12 wherein said first forwarding instruction identifies said egress port uniquely within said system.

15. A network unit as in claim 12 wherein the network unit includes header logic which inserts in said packet said temporary header including said forwarding instructions as first and second fields and said order instruction as a flag field.

16. A cascade system of network units including at least two forwarding units which have a respective plurality of external ports by which data packets can enter and egress from the system, a communication fabric connecting the network units and at least one processing unit which is connected thereto by at least one internal port, wherein each of the forwarding units is operable on receipt of a packet:
(a) to perform a look-up to determine an egress port;
(b) to determine whether the packet is to be diverted to a selected processing unit;
(c) to provide the packet with a temporary header comprising a first forwarding instruction to be executed identifying said egress port and a second forwarding instruction to be executed identifying a diversion port by which the packet is to reach said selected processing unit; and
(d) to set in said temporary header an order field that is separate from the first forwarding instruction and the second forwarding instruction and wherein the order field indicates an order instruction that the packet is to be sent through the diversion port first and to be sent through the egress port following receipt of the packet back from the selected processing unit.

17. A cascade system as in claim 16 wherein said selected processing unit is operative on receipt of said packet by way of said diversion port to change said order field to specify that the packet should be sent to said egress port.

* * * * *